United States Patent Office 3,541,431
Patented Nov. 17, 1970

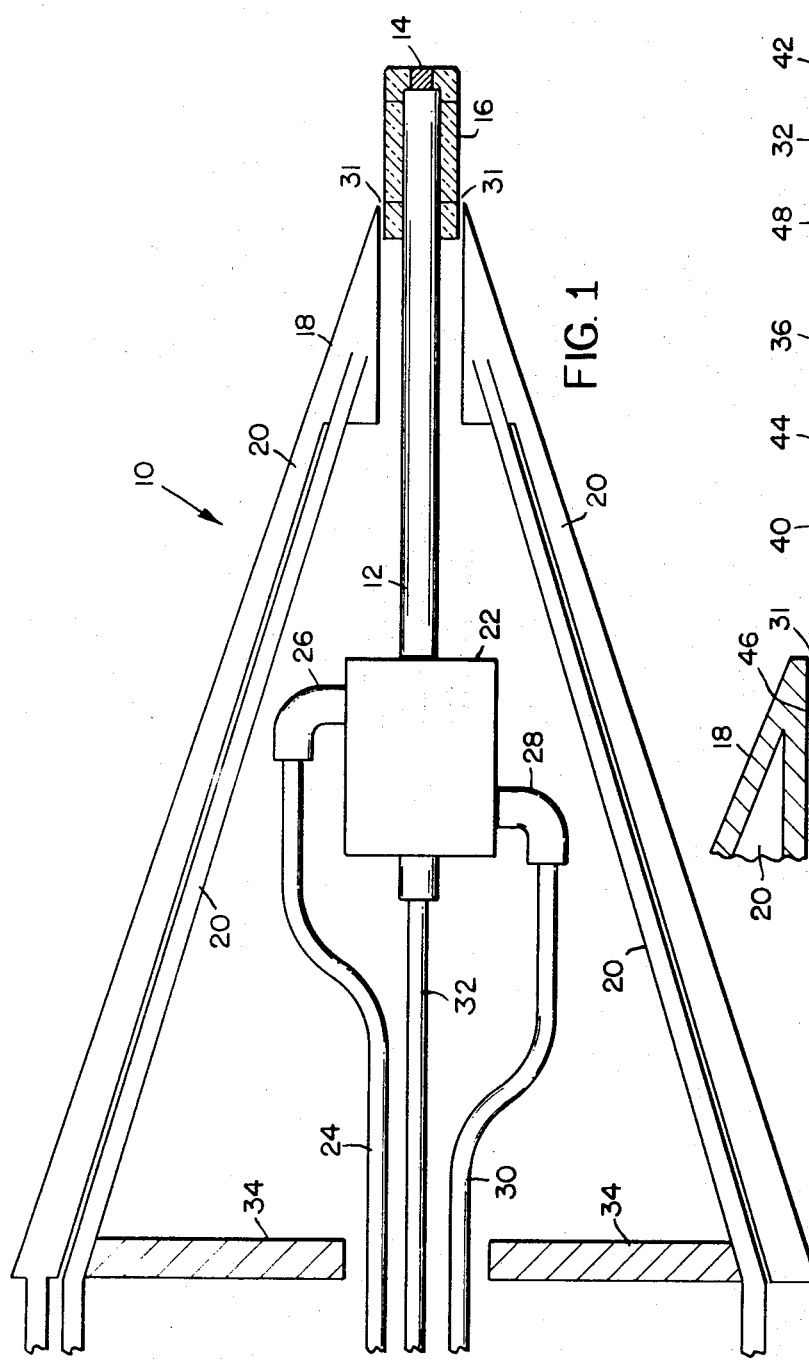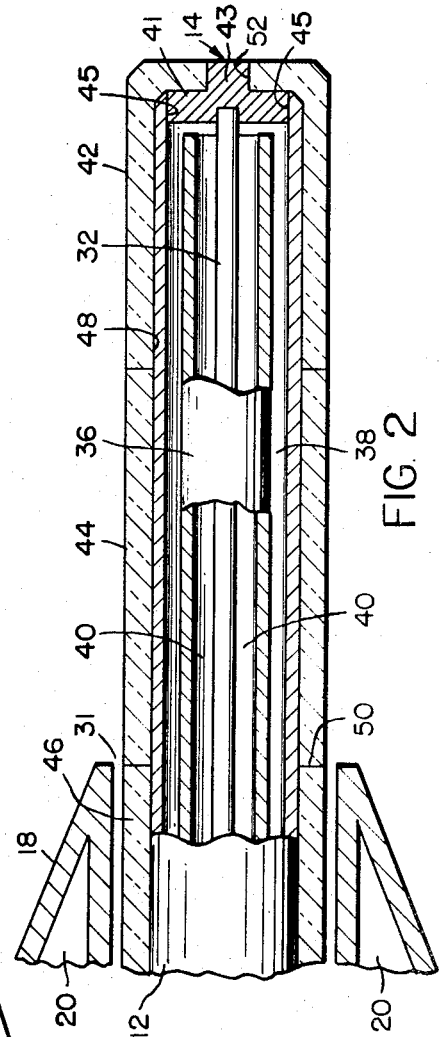

3,541,431
LIQUID COOLED ABRASION RESISTANT ELECTROSTATIC PROBE FOR MEASURING THE ELECTRICAL CHARACTERISTICS OF FLAMES, ROCKET EXHAUSTS AND THE LIKE
George Maise, Princeton, Richard J. Ronco, Jamesburg, and Alberto J. Sabadell, Princeton, N.J., assignors to Ritter Pfaudler Corporation, Rochester, N.Y., a corporation of New York
Filed July 31, 1968, Ser. No. 749,030
Int. Cl. G01r 5/28, 29/12
U.S. Cl. 324—32
6 Claims

ABSTRACT OF THE DISCLOSURE

An electrostatic probe for measuring the electrical characteristics of flames, rocket exhausts and plasma jets is disclosed. The probe permits a well defined electrode collector surface to be exposed to the ionized gas in the plasma to be measured. The electrode collector surface is contained on a water cooled probe tube which is surrounded by an insulator, the rear portion of which is surrounded by a liquid cooled shield which serves also as the second electrode for the electrical circuit for the probe.

BACKGROUND OF THE INVENTION

This invention relates to an electrostatic measuring device generally, and more patricularly to a liquid cooled electrostatic probe capable of being continuously immersed in extreme high temperature environments as well as abrasive and corrosive environments such as found in rocket and turbojet exhaust, flames, arc jets or the like.

In rocket motor exhausts, the presence of electrons in the exhaust can cause attenuation and scattering of radar signals. In order to be able to computs the extent of this interference, it is necessary to know the distribution of the electrons in the path of the radar beam. The electrostatic probe is a suitable instrument for measuring this distribution.

Electrostatic probes, of the type hereinafter described, utilize a collector electrode surface exposed to the ionized gas in which measurements are to be taken. A voltage is applied to the electrode collector with a second electrode, located nearby, serving to complete the electrical circuit. When a voltage is applied to the collector, the current is measured and the current-voltage characteristics of the ionized gas are used to determine the electrical properties of the gas.

One of the major problems in designing electrostatic probes is preventing the probe from melting when placed in the extremely high temperature environment found in rocket exhausts. In addition, the electrode must be electrically insulated from the rocket exhaust, except for the immediate area where the charged particles are collected on the electrode.

Prior art probes of this general type have been built and used successfully in high temperature environments. One type of probe is described in the AIAA Journal, vol. 5, No. 1, on pages 84–90. This probe design utilizes a ceramic coating over the probe tube to insulate the probe structure from the flowing ionized gas, with a liquid flowing interiorly of the structure to prevent the structure from melting when immersed in a high tempearture atmosphere. Limitations have been found with this type of probe design caused by the insulator coating being unable to withstand the high temperature flame or rocket exhaust environment.

Another approach to electrostatic probe design is shown in Report No. 478 of the North Atlantic Treaty Organization—Advisory Group for Aeronautic Research and Development, dated September 1964. This probe design consists of an electrode which is insulated from an outer metallic structure by a ceramic washer. Designs such as this are not suitable for electrical measurements in flame or rocket motor exhausts due to a buildup of combustion products on the ceramic parts which form an electrical conducting path between the electrode and the outer metallic structure resulting in the probe becoming inoperative.

While electrostatic probes have been used for many years to measure electrical characteristics of plasmas, their use in rocket exhausts presents some particularly difficult problems. A probe designed for such high temperature use must withstand an extremely hostile environment such as being exposed to a combination of high temperature, high heat flux, corrosive gases and possible erosion by high-speed solid particles, such as rocket exhausts with aluminized propellents.

In order to maintain the probe at a sufficient low temperature to prevent electron emission from the surface internal cooling must also be provided which requires the probe of necessity to be relatively large.

SUMMARY OF THE INVENTION

The present invention overcomes the difficulties and limitations found in the use of prior art probes with flame and rocket exhaust environments and comprises basically an electrode member having an exposed electrode surface contained on one end of a water cooled probe tube with an insulator surrounding both the probe tube and the electrode member leaving only the electrode surface exposed to the rocket flame. The insulater thermally and electrically insulates the probe tube and the electrode member from the rocket exhaust. Surrounding the rear portion of the insulator and the probe tube and spaced apart therefrom to provide an air gap, is a fluid cooled heat shield thermally insulating a greater portion of the probe tube from the flame. This shield is located a sufficient distance from the exposed portion of the electrode to minimize the chance of electrical leakage between electrodes, and also serves as a second electrode for completing the electrical circuit for the electrostatic probe.

Accordingly, it is an object of the invention to provide a new and novel fluid cooled electrostatic probe which may be utilized in the extremely high temperature conditions found in rocket motor exhausts.

Another object of the invention is to provide a new and novel electrostatic probe with which may be used in high temperature environments containing abrasive and corrosive combustion products.

Yet another object of the invention is to provide a new and novel high temperature electrostatic probe that is designed to prevent breakdown of the electrical insulation between the two electrodes used in the probe.

These and other objects and advantages of the invention will become apparent from a study of the attached drawings and from a reading of the description of the preferred embodiment.

BRIEF DESCRIPTION OF THE DRAWINGS

FIG. 1 is a cross sectional view of the invention showing the location of the parts generally; and FIG. 2 is a fragmentary cross section showing the preferred embodiment of the electrode end of the probe tube.

DESCRIPTION OF THE PREFERRED EMBODIMENT

Referring more particularly to the drawings, there is shown generally at 10 an electrostatic probe comprising a probe tube 12 having an electrode member 14 contained on one end of the probe tube 12. The electrode member 14 contains a surface exposed to the high temperature rocket exhausts which acts as one electrode for the probe.

Surrounding the electrode member 14 is an insulator 16, which may be constructed as shown in FIG. 1 or with other equivalent structures.

Surrounding the probe tube 12 is a heat shield 18 having internal passages 20, through which an appropriate cooling liquid may be circulated. The heat shield 18 is electrically grounded and electrically insulated from the probe tube 12 and the electrode member 14, and serves as a second electrode for completion of the electrical circuit necessary for operation of the electrostatic probe.

The probe tube 12 is attached to a metal block 22, which is electrically insulated from the heat shield 18. Cooling for the probe tube 12 is obtained by means of circulating a high pressure cooling fluid through the plastic inlet tube 24 and inlet elbow 26 fastened to the metal block 22. The liquid cooling passes through the metal block 22 to the interior of the probe tube 12 by means of internal passageways, not shown, contained in the metal block 22.

After passing through the probe tube 12, by means which will be more fully described hereinafter, the circulating fluid leaves the probe tube 12 and returns to the metal block 22 passing out of the metal block 22 through an outlet elbow 28 and a plastic outlet tube 30. All of the metallic parts of the probe lying inside the conical shield 18 are coated with a layer of plastic material such as polyvinylchloride in order to insure complete electrical insulation between the probe and the conical shield 18.

The insulator 16 completely surrounds that portion of the probe tube 12 that extends beyond the heat shield 18 except for a well defined electrode surface on the electrode member 14 which is exposed to the ionized gas. By the use of the plastic inlet and outlet tubes 24 and 30, the entire probe tube structure is insulated electrically from the ground and the grounded heat shield 18 and therefore the electrical current necessary for operation of the electrostatic probe can flow only through the well defined electrode surface of the electrode member 14.

The heat shield 18 surrounding the probe tube 12 and insulator 16 is spaced apart from the insulator 16 thereby forming an air gap 31. The use of an air gap 31 minimizes the chances of forming an electrical path between the electrode member 14 and the grounded shield 18 by a build-up of combustion products which would short out the electrical circuit and impair the operation of the electrostatic probe 10.

The heat shield 18 also serves as a means of protecting the plastic inlet and outlet tubes 24 and 30 and the thermocouple lead 32 from the extreme heat encountered when the electrostatic probe 10 is located in a rocket exhaust.

The entire electrostatic probe structure 10 may be positioned in the rocket exhaust by means of the back plate support 34 and well known mounting means, not shown in the drawings.

Referring now more particularly to FIG. 2, there is shown a fragmentary cross sectional view of the tip of the probe tube 12, which contains the electrode member 14. The probe tube 12 has contained therein a second tube 36, of somewhat smaller diameter than that of the probe tube 12 and which serves as a means of forming the passageways through which the cooling fluid may be circulated.

The cooling fluid entering the probe tube from the metal block 22 passes between the second tube 36 and the probe tube 12 in the passageways shown as the numerals 38 in FIG. 2. The cooling fluid, after circulating to the end of the probe tube 12, returns through the interior of the second tube 36 by means of the passageways designated as numerals 40 in FIG. 2. The second tube 36 contains, in the center thereof, a sheathed thermocouple lead 32 for measuring the temperature of the electrode member 14. The probe tube 12 may be formed of copper or some other suitable material and has formed on the end thereof the electrode member 14 which may also be copper or some other suitable material.

The electrode member 14, when constructed in the configuration shown in FIG. 2, has an enlarged inner portion 41, and a smaller outer portion 43 which serves as the electrode surface in contact with the flame. The enlarged inner portion 41 is bonded, by well known means, to the probe tube 12 at the surface 45 and serves as a heat transfer means for transferring the heat received by the smaller outer portion 43 to the cooling fluid circulating within the passageway 38 and 40.

In the preferred embodiment shown in FIG. 2, the insulator 16 comprises a cap 42, a first sleeve 44 and a second sleeve 46, which are formed from a ceramic material and are bonded to the probe tube 12 by techniques well known in the art. Satisfactory insulators have been formed of alumina and beryllia which are metallized and plated on the inner surface 48 on the insulator 16 and bonded to the probe tube 12 by thinning their interior surfaces and then soldering the insulator 16 to the probe tube 12. With this method of attaching the ceramic insulator 16 to the probe tube 12, a solid mechanical bond is provided as well as an effective heat transfer means for cooling purposse. Should a crack develop in the ceramic insulator 16, the insulator will remain bonded to the probe tube 12 and continue to provide the necessary electrical insulation for proper operation of the electrostatic probe 10.

When the insulator 16 is constructed with a cap 42 and the pair of sleeves 44 and 46, it is preferred to position the intersection 50 between the first sleeve 44 and the second sleeve 46 in proximity to the point where the tip of heat shield 18 comes closest to the probe tube 12. In this manner, a build up of thermal stresses in the insulator 16 is minimized due to the large temperature gradients between the portion of the probe tube 12, exposed to the rocket exhaust and the portion that is shielded by the heat shield 18.

The insulator cap 42 has formed in the bottom portion thereof an aperture 52, through which the smaller outer portion 43 of the electrode member 14 is designed to fit. The exposed surface of the smaller outer portion 43 of the electrode member is the only portion of the electrode member 14 that is exposed to the ionized gases in the rocket exhaust and serves as the electrode. The diameter of the smaller outer portion 43 is determined by means well known in the art with successful diameters ranging from 0.06 to 0.10 inch having been used when the outer diameter of the cap 42 ranges from 0.25 to 0.33 inch in the preferred embodiment shown.

In operation, the electrostatic probe 10 is mounted in a rocket exhaust or other high temperature environment by means of the back plate support 34 and well known mounting means, not shown in the drawings. The heat shield 18 is electrically grounded and electrically insulated from the probe tube 12 and the thermocouple lead 32. The fluid coolant means for the probe tube structure is then circulated, by known circulating means, through the inlet tube 24 and the outlet tube 30. In addition, fluid coolant means for the heat shield 18 is then circulated, by known circulating means, through the internal passageways 20, contained in the heat shield 18.

From the foregoing, it is apparent that there is provided a new and novel electrostatic probe capable of use in measuring the electrical characteristics of high temperature flames and rocket exhausts. The probe is also capable of being used for extended periods in exhausts having combustion products, without adverse effect on the measuring ability of the probe. In addition, there is shown a probe having the ability to withstand the high temperature environment of a rocket exhaust without melting and thereby failing to operate as a measuring instrument.

These and other objects have been accomplished by the novel use of a fluid cooled insulated probe tube with a liquid cooled heat shield surrounding the rear portion of the probe tube and spaced apart therefrom to form an air gap between the probe tube and the heat shield. From the foregoing, it can be seen that new and novel means have been provided for accomplishing all of the objects and advantages of the invention.

Having described our invention, we claim:

1. An electrostatic probe for measuring the electrical characteristics of flames, rocket exhausts and the like and for protecting the probe from abrasive and corrosive combustion products therein comprising:
   (a) a support member;
   (b) a probe tube extending outwardly from said support member;
   (c) an electrode member fixed to and sealing the outwardly extended end of said probe tube, said electrode member having an exposed electrode surface;
   (d) a ceramic insulator surrounding and fixed to said probe tube, the inner surface of said insulator being in heat transfer relationship with said probe tube, said insulator including a cap extending over a portion of the exposed electrode surface of said electrode member, whereby said insulator electrically insulates and protects said probe tube and portion of said electrode member from said flame, rocket exhaust and the like and the abrasive and corrosive combustion products therein;
   (e) a heat shield carried by said support member and surrounding a portion of said probe tube, said heat shield having one end spaced axially from the outward extending end of said probe tube to expose the same and spaced radially from said insulator to for an air gap therebetween;
   (f) said probe and heat shield being in an electrical circuit wherein said heat shield forms a second electrode for said circuit;
   (g) cooling means circulating coolant through said probe tube to said electrode member for cooling said electrode member; and
   (h) means for circulating coolant through said heat shield for cooling said heat shield.

2. An electrostatic probe as described in claim 1 wherein said cap has an aperture formed in the bottom thereof said electrode member comprising:
   (a) an enlarged inner portion sealed about its periphery to the outwardly extended end of said probe tube; and
   (b) a smaller outer portion associated with said inner portion and protruding through said aperture, to contact said flame, rocket exhaust and the like.

3. An electrostatic probe as described in claim 1 wherein said ceramic insulator comprises:
   (a) a sleeve portion surrounding and bonded to the exposed portion of said probe tube said bond providing a heat transfer means between said sleeve and tube; and
   (b) said cap being in juxtaposition with said sleeve and surrounding said probe tube at said electrode member.

4. An electrostatic probe as set forth in claim 3 wherein said ceramic insulator comprises:
   (a) said cap having an aperture in the bottom thereof to receive a portion of said electrode member extending therethrough for contacting said flame, rocket exhaust or the like;
   (b) said sleeve portion having:
      (i) a first section in juxtaposition with said cap and surrounding said probe tube and
      (ii) a second section in juxtaposition with said first sleeve and surrounding said probe tube; and
   (c) said heat shield being conical with the apex of said shield located at the intersection of said first and second sleeve sections whereby a build-up of thermal stress in said sleeve sections is minimized.

5. An electrostatic probe as set forth in claim 1 including a thermocouple extending axially through said probe tube and fixed to one end of said electrode member for measuring the temperature thereof.

6. An electrostatic probe as set forth in claim 1 wherein said cooling means includes a fluid conduit extending axially into said probe tube, the wall of said fluid conduit and probe tube forming a space therebetween for the passage of coolant into said probe tube and said fluid conduit providing for the passage of coolant out of said probe tube.

References Cited

UNITED STATES PATENTS 3,447,071  5/1969  Morris et al. _____ 324—72.5 XR

OTHER REFERENCES

Grey et al.: Cooled Electrostatic Probe, AIAA Journal, vol. 5, No. 1, pp. 84–90, January 1967.

Powers: Measurements of the Current Density Distribution in the Exhaust of an MPD Arcjet, AIAA Journal, vol. 5, No. 3, March 1967, pp. 545–550.

GERARD R. STRECKER, Primary Examiner

U.S. Cl. X.R.

324—72.5